Dec. 1, 1959 H. MARKE 2,914,882
FISHING ROD GUIDE
Filed Sept. 7, 1956

INVENTOR.
HANS MARKE
BY
D. Gordon Angus
ATTORNEY.

United States Patent Office 2,914,882
Patented Dec. 1, 1959

2,914,882

FISHING ROD GUIDE

Hans Marke, Burbank, Calif., assignor to Aetna Products & Manufacturing Co., Burbank, Calif., a corporation of California Application September 7, 1956, Serial No. 608,540

3 Claims. (Cl. 43—24)

This invention relates to fishing rod guides and has for its principal object to provide a guide of a simple construction which is adapted to be readily fitted to fishing rods of a number of different sizes.

A fishing rod is commonly constructed with a number of metal line guides along its length between the reel or butt end and the relatively thin flexible tip end. Such line guides ordinarily have their eye openings aligned with an eye or opening of a tip-top guide on the tip end of the rod. The term "guide" as used in the present specification and claims covers broadly those devices for guiding the line, namely line guides and tip tops.

In my copending application Serial No. 284,489, filed April 26, 1952, now Patent No. 2,762,154, I have disclosed and claimed a fishing rod guide made of resilient wire-like material and comprising a coil for the guiding element. This has provided a guide which can be readily fitted to a rod, and is useful for fitting to rods of various sizes.

In accordance with the present invention I am able to use a rigid eye for the guide while retaining the advantage of flexible resilient wire-like footing elements.

By my present invention there is provided a rigid eye type guide which can be readily fitted either as a tip-top or line guide, to fishing rods having a considerable range of cross-sectional areas. I carry out my invention by provision of a rigid eye member and resilient footing members having ends which are brought down to footings adapted to be bound along both sides of the flexible rod member.

The foregoing and other features of my invention will be better understood from the following detailed description and the accompanying drawing of which:

Figure 1:
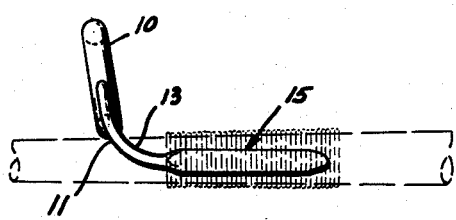
Fig. 1 shows a side view of a guide in accordance with my invention.
Figure 2:
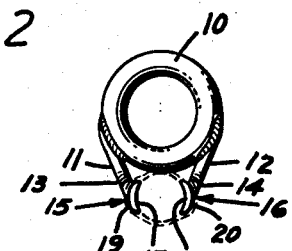
Fig. 2 shows an end view of the guide of Fig. 1.

Referring to Figs. 1 and 2 of the drawing, there is shown a guide arranged as a line guide. It is preferably formed of Monel metal, or at least some metal which does not rust. It comprises a guide opening or eye which is a rigid circular ring 10. The ring 10 is attached, as by silver soldering or welding, to legs 11 and 12. The legs 11 and 12 are made of resilient material, such as a resilient wire or wire-like material, such as spring-tempered metal, preferably Monel metal, or some metal which does not rust. These legs are brought out almost parallel but somewhat converging toward each other and they lie in substantially the same plane and at an angle to the longitudinal axis of the ring 10 as shown in Fig. 1. Adjacent to the place on the rod on which the guide is to be mounted the legs 11 and 12 are formed into respective footings 15 and 16 which, when the legs are unsprung, normally converge toward each other. Each of these footings makes an angle to its respective leg, and the footings lie in a plane which makes an angle to the plane of said legs. The footings 15 and 16 comprise webs of substantially greater width than their thickness. Preferably the insides of the webs of the footings are formed into partial cylindrical surfaces 17 and 18, as shown in Fig. 2, in order that they may more readily fit the rounded exterior of the fishing rod. The cylindrical shape of the webs does not differ very much from a plane; and it accordingly may be considered that the two webs facing each other lie substantially in planes which converge somewhat toward each other in the direction away from the legs when the legs are unsprung. Furthermore the outer surfaces of the footings 15 and 16 are similarly made rounded or cylindrical at 19 and 20, respectively, so that a binding, such as nylon thread, may readily be applied.

Fig. 1 illustrates the guide applied to a rounded fish rod, shown in dotted lines, and for this purpose the footings 15 and 16 are sprung apart by springing the resilient legs sufficiently to receive the substantially cylindrical fish rod. Under this condition the planes of the webs become nearly or substantially parallel with each other. As thus placed, a binding thread represented by a number of dotted lines in Fig. 1 is wrapped around the footings and the rod; and in accordance with common practice a varnish may be applied over the binding.

Figure 3:
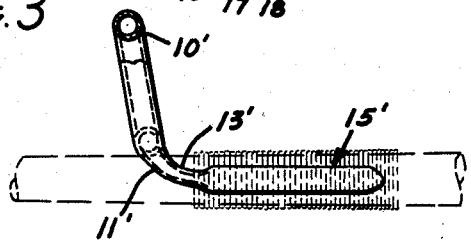
Fig. 3 shows partly in cross section another embodiment of a guide in accordance with my invention.
Figure 4:
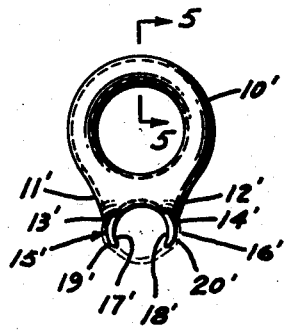
Fig. 4 shows an end view of the guide of Fig. 3.
Figure 5:
Fig. 5 is a cross section view taken at line 5—5 of Fig. 4.

In Figs. 3, 4 and 5 there is shown a variation of construction of a line guide which has the same general configuration as the assembled line guide shown in Figs. 1 and 2. The difference between the first embodiment in Figs. 1 and 2 and the second embodiment of the line guide shown in Figs. 3, 4 and 5 resides in their construction.

Corresponding parts of the two embodiments are numbered with like numbers, the numbers of the second embodiment being identified by prime numbers and all the above description of the first embodiment in its assembled form and use applies also to the second embodiment.

The guide of Figs. 3, 4 and 5 comprises one piece of sheet metal stamping which is blanked and formed to arrive at a finished line guide.

In Fig. 5 there is shown a cross section of the ring 10 taken at line 5—5 in Fig. 4. The ring 10 of Figs. 3, 4 and 5 is hollow as shown by the cross section view in Fig. 5. In Fig. 3 the cut-away area also shows the ring 10 as being hollow. The ring 10 in the second embodiment is hollow as a result of its formation from a stamping. In Fig. 5 edges 21 of the stamping are abutted edge to edge in such a manner that the edges 21 are as close to one another as possible and the hollow annular ring 10, in Figs. 3, 4 and 5, is thereby formed from a part of the metal stamping.

The stamping and forming of line guides of the type disclosed in this invention is desirable for a number of reasons, some of which are economy of manufacture and strength of a one-piece construction.

From the foregoing description it will readily be understood that by my two embodiments of novel guides there are provided arrangements which can readily be applied to a fish rod and furthermore that the same line guide can be applied to a number of sizes of rod diameters. Owing to the resilience, in both embodiments, of the portions 11, 12, 13 and 14 which normally converge somewhat toward each other, the footings 15 and 16 may be sprung apart from their normal position to a considerable extent. Thus the footings can readily be applied to relatively small diameter rods such that portions 11, 12, 13 and 14 may continue to converge toward each other or on the other hand they may be applied to a larger diameter rod such that the portions 11 and 12 are made substantially parallel to each other or even perhaps a trifle beyond parallel.

While the guides illustrated and described in reference to the particular embodiments disclosed herein, are shown as line guides it will be understand that they could as well be used as tip-tops in a well-known manner by placing them at the tip end of a rod.

The invention is not limited except in accordance with the scope of the appended claims.

I claim:

1. A fishing rod guide comprising a unitary rigid ring eye having an opening defined by a smooth, continuous curved wall, a pair of resilient legs rigidly attached to said ring eye at locations spaced from each other, said legs converging toward each other in a first plane in a direction away from said ring eye, and each leg having a footing at its end away from the ring eye, each of said footings being disposed at an angle to its respective leg, and the said footings lying in a plane which is at an angle with said first plane and converging toward each other in a direction away from said legs when the legs are unsprung and the footings are unattached to a rod, each of said footings comprising a web of a width substantially greater than its thickness, said webs facing each other and lying substantially in respective planes which converge toward each other in the direction away from said legs when said legs are unsprung, said footings thereby being adapted to be moved apart by springing said legs, to embrace opposite sides of said rod, in which position the webs lie in planes which are substantially parallel to each other.

2. A fishing rod guide according to claim 1 in which both the inside and outside surfaces of the footings are partly arcuate in shape so that said inside surface conforms substantially with the exterior surface of a fish rod and the outside surface enables a binding to be applied around the rod and the footings.

3. A fishing rod guide comprising a rigid ring eye; a pair of legs, said pair of legs having free ends which converge toward each other, said ends constituting footings adapted to be fitted to opposite sides of a fishing rod, said ring eye and pair of legs being formed of one-piece of stamped metal, said ring eye being formed by abutting edges of said one-piece of stamped metal against one another, said ring eye being formed into a hollow annular shape.

References Cited in the file of this patent

UNITED STATES PATENTS

| 1,473,437 | Lindstrom | Nov. 6, 1923 |
| 2,573,647 | Marke | Oct. 30, 1951 |

OTHER REFERENCES

Mildrum Fishing Rod Mountings, Catalogue No. 11 (1500–SP–8–50), of the W. W. Mildrum Jewell Co., of East Berlin, Conn., page 16, The Mildarbide Big Game Fishing Guide.